United States Patent [19]

Rossi et al.

[11] Patent Number: 5,102,764
[45] Date of Patent: Apr. 7, 1992

[54] STYRENE BUTYLACRYLATE TONER WITH MAGENTA DYE

[75] Inventors: Louis J. Rossi, Rochester, N.Y.; Julie P. Harmon, Gainesville, Fla.

[73] Assignee: Eastman Kodak Company, Rochester, N.Y.

[21] Appl. No.: 450,935

[22] Filed: Dec. 15, 1989

[51] Int. Cl.$^5$ ............................................. G03G 9/00
[52] U.S. Cl. .................................... 430/110; 430/106; 430/109
[58] Field of Search ........................ 430/110, 109, 137

[56] References Cited

U.S. PATENT DOCUMENTS 4,502,135  12/1985  Winnik et al. ................... 430/110
4,954,410  9/1990   Takuma et al. .................. 430/109

FOREIGN PATENT DOCUMENTS 0330487  8/1989  European Pat. Off. ............ 430/106
0136048  8/1983  Japan ................................ 430/110

Primary Examiner—Marion E. McCamish
Assistant Examiner—S. Crossan
Attorney, Agent, or Firm—Dressler, Goldsmith, Shore, Sutker & Milnamow, Ltd.

[57] ABSTRACT

Toner particles are provided wherein a magenta dye is dispersed in a styrene butylacrylate copolymer. The dispersed dye is not aggregated, is colorfast, and does not sublime as the particles are heat fused. The dye is a 1,4-diaminoanthraquinone which is substituted in the 2 and 3 positions with phenoxy groups that are, in turn, substituted by either a lower alkyl or chloro group.

5 Claims, No Drawings

STYRENE BUTYLACRYLATE TONER WITH MAGENTA DYE

FIELD OF THE INVENTION

This invention is in the field of toner powders having a poly(styrene-co-butylacrylate) binder and a dispersible, colorfast, stable magenta dye.

BACKGROUND OF THE INVENTION

The use of copolymers of styrene with n-butylmethacrylate or n-butylacrylate as polymeric binders for toner powders is known (see, for example, U.S. Pat. Nos. 4,312,932; 4,324,851; and 4,601,967) and the use of a magenta pigment in toner particles is disclosed (see the aforementioned '932 and '851 patents).

However, heretofore, it has not been possible to employ such styrene/acrylate copolymers in three-color imaging because a suitable magenta colorant for use with such copolymers was not known.

Magenta dyes that are suitable for use with toner powder polyester resins tend to aggregate in styrene/butyl acrylate copolymers. Also, magenta dyes which are lightfast in polyesters are often fugitive in such styrene/butylacrylate copolymers.

It was discovered that 1,4-diamino-2,3-diphenoxyanthraquinone, a known magenta dye identified as Disperse Violet 31, C.I. 60205, and available commercially from American Hoescht under the designation "Solvaperm TM Red Violet R", was dissolvable in such copolymers without aggregation and was lightfast when in such copolymers. However, unfortunately, this dye sublimes from a matrix of such polymer when a toner powder thereof is heat fused.

So far as now known, a suitable magenta dye for compounding with such styrene/butylacrylate copolymer was not known prior to the present invention.

SUMMARY OF THE INVENTION

This invention provides toner powders of styrene butylacrylate copolymers containing a dispersed magenta dye. These powders are useful in the three-color imaging.

The magenta dye used in the invention is a 1,4-diaminoanthraquinone that has been substituted in the 2 and 3 positions with substituents that increases the dye molecular weight and overcomes the sublimation problem and improve the dispersability capability of the dye in the polymer. When the substituted dye is dissolved in the polymer, the polymer is formed into toner powder, and the toner powder is used for imaging and then is heat fused to a receiver, it is found that aggregation is avoided and lightfastness is maintained, but dye color is not adversely altered.

As a consequence of these properties, this magenta dye makes possible the use of styrene butylacrylate copolymers in three color imaging.

Other and further advantages, aims, features and the like will be apparent to those skilled in the art when taken with the appended claims.

DETAILED DESCRIPTION

A presently preferred class of styrene butylacrylate polymers contains about 60 to about 95 weight percent styrene and about 5 to about 40 weight percent butylacrylate. These polymers preferably have a glass transition temperature in the range of about 40° to about 90° C.

The class of anthraquinone magenta dyes employed in the practice of this invention is characterized by the formula:

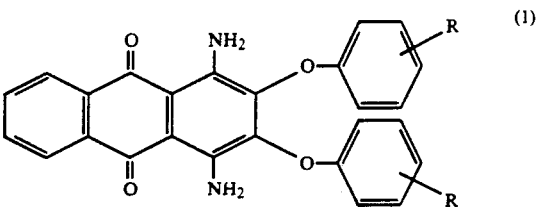

wherein R is selected from the group consisting of chlorine and lower alkyl.

The term "lower" as used herein in reference to alkyl means that such group contains not more than 7 carbon atoms. If more than two carbon atoms are present, the alkyl chain may be branched. Preferably, R is either a para-tertiary butyl group or a meta chloro group.

Compounds of Formula (1) can be prepared by any convenient procedure. For example, 1,4-diaminoanthraquinone (available commercially from American Hoescht as "Solvaperm Red Violet R") dissolved in a solvent such as a nitrobenzene can be reacted with two moles of sulfuryl chloride to produce 1,4-diamino-2,3-dichloroanthraquinone. Thereafter, reaction with the appropriate substituted phenol, with or without a solvent, in the presence of potassium carbonate, gives the substituted anthraquinone of Formula (1).

The absorption spectrum of the 2,3-diphenoxy anthraquinone is not altered by the chloro or alkyl substitution, while the lightfastness, dispersability (without aggregation) and sublimation thereof in styrene butylacrylate copolymers are improved.

The improved dispersability is demonstrated by optical microscopy. The improved colorfastness is demonstrated by 21 day fluorescence (16 k lux).

Conventional toner powder charge control agents can be employed, such as those described, for example, in U.S. Pat. Nos. 3,893,935; 4,079,014; 4,323,634 and British Patent Nos. 1,501,065 and 1,420,839. Presently preferred charge control agents are (identify).

Usually, a toner composition of the invention has the following composition on a 100 weight percent basis:
about 93 to about 99 wt. % copolymer of styrene/and butylacrylate
about 0.5 to about 5.0 wt. % magenta dye of Formula (1), and
about 0.5 to about 2.0 wt. % charge control agent.

Toner particles of this invention typically have particle sizes in the range of about 8 to about 20 microns.

Toner particles of this invention can be prepared by any convenient procedure. For example, a liquid mixture of styrene and n-butylacrylate monomers is prepared. A dye of Formula (1) is dissolved therein in a desired amount. A charge control agent and an initiator, such as 2,2'azobis-(2,4-dimethylvaleronitrile), or the like is also added. The components can be dispersed in water as droplets and polymerized at temperatures of about 60° to 65° C. for 8 hours with mixing, using a preparation procedure adopted for example, from the procedure of Example 3 of U.S. Pat. No. 4,601,967. The polymerized solid particles, that contain the magenta dye dispersed therein, are collected by filtering the reaction mixture or the like, and the recovered particles are washed and dried.

The invention is illustrated by the following examples.

EXAMPLE 1

Preparation of Magenta Dye

Magenta dyes are prepared as follows:

(a) 1,4-diaminoanthraquinione chlorination 1,4-diaminoanthraquinone (1 part) is dissolved in nitrobenzene (10 parts) and sulfuryl chloride (2 parts) was added to the solution. The two solutions are admixed so as to achieve a mole ration of 1,4-diaminoanthraquinone to sulfuryl chloride of 1:2 and the resulting mixed system is heated at steam bath temperatures for one hour. Nitrobenzene is removed by steam distillation and the crude product is recrystallized from pyridine to give 1,4-diamino-2,3-dichloroanthraquinone, m.p. 287° C.

(b) Substituted phenol reaction 6.2 grams 90.020 mole) of the 1,4-diamino-2,3-dichloroanthraquinone were suspended in 60 grams of m-chlorophenol containing 8.0 grams (0.058 mole) potassium carbonate and heated for 10 hours at 200° to 210° C. The reaction mixture was cooled to room temperature, solidified, and treated with 100 ml of 50% aqueous sodium hydroxide, and then further diluted with 300 ml of water. The red solid obtained was collected, and washed free of base to give 8.9 grams of crude product dye having a melting point of 163°–178° C. Two successive crystallizations from toluene were undertaken to yield 6.4 grams (6.5% yield) of a red solid whose melting point was 178°–180° C.

Analysis:

Calcd for: $C_{26}H_{16}Cl_2N_2O_4$ (491.3): C,63.6; H,3.3; Cl,14.4; N,5.7, Found: C,64.1; H,3.5; Cl,14.7; N,5.6.

The product is thus a compound of Formula (I) wherein R is m-chloro

EXAMPLE 2

The procedure of Example 1(b) is repeated except that in place of the m-chlorophenol, p-chlorophenol is used. The product is a compound of Formula (1) wherein R is p-chloro.

Calcd for: $C_{26}H_{16}Cl_2N_2O_4$ (491.3): C,63.6; H3.3; Cl4.4; N5.7. Found: C,63.8; H,3.1; Cl,13.9; N,5.6.

EXAMPLE 3

The procedure of Example 1(b) is repeated except that in place of the m-chlorophenol, p-tertiary butyl phenol is used. The product is a compound of Formula (1) wherein R is p-t-butyl.

Cacld. for: $C_{34}H_{34}N_2O_4$(534.7):C,76.4; H,6.4; N,5.2. Found: C,76.5; H,6.5; N,5.3.

EXAMPLE 4

The procedure of Example 1(b) is repeated except that in place of the m-chlorophenol, p-sec-butyl phenol is used. The product is a compound of Formula (1) wherein R is p-sec-butyl.

Cacld. for: $C_{34}H_{34}N_2O_4$(534.7):C,76.4; H,6.4; N,5.2. Found: C,75.8; H,5.9; N,5.0.

EXAMPLE 5

Preparation of Toner Powder

The following particulate composition was prepared by mechanical mixing:

| Component | Weight Percent 100 weight percent basis |
|---|---|
| Styrene-butylacrylate Copolymer | 97 |
| Dye of Formula (I) | 2 |
| Charge Control Agent | 1 |

The styrene-butylacrylate copolymer had a molecular weight range of 50 to 250,000 and was comprised of:

| Component | Mole Percent (100 mole percent basis) |
|---|---|
| styrene | 77 |
| butylacrylate | 23 |
| divinyl benzene | 0.6 |

The Formula (1) dye was one wherein R was m-chloro.

The charge control agent was methyltriphenyl phosphonium tosylate.

The composition was melt fused by roll mill compounding for 10 minutes using a mill temperature of 150° C.

The cooled, so heat fused composition was course ground in a Wiley Mill and fine ground in a fluidized bed mill operating at 70 psi using a feedrate of 1 gram per minute. The product powder had a particle size in the range of about 2 to about 5 microns.

EXAMPLE 6

Preparation of Toner Powder

The procedure of Example 5 was repeated except that the dye of Formula (1) was one wherein R was p-t-butyl.

EXAMPLE 7

Preparation of Toner Powder (Comparison)

The procedure of Example 2 was repeated except that the dye used was magenta Disperse Violet 31, C.I. 62025 from American Hoescht as "Solvaperm TM Red Violet R".

EXAMPLE 8

Evaluation

The reflection spectrum of the toner powder of Example 7 was identical to the reflection spectrum of each of the toner powders of Examples 5 and 6.

The lightfastness of each of the toners of Examples 5, 6 and 7 is unusually high for a styrene type polymeric binder. A fade of about 1.0 to 1.2% was observed for a 7 day high intensity daylight light exposure.

The toner of Example 7 when heated to 340° F. experienced sublimation of dye from the polymeric binder. The toner of each of Examples 5 and 6 was sublimation free at 340° F. The 340° F. temperature is near the temperature at which the toner powder of Examples 5, 6 and 7 experiences heat fusion.

The invention has been described in detail with particular reference to preferred embodiments thereof, but it will be understood that variations and modifications can be effected within the spirit and scope of this invention.

We claim:

1. Toner particles for developing latent electrostatic images comprised of a magenta dye dispersed in a styrene butylacrylate copolymer, said magenta dye being characterized by the formula:

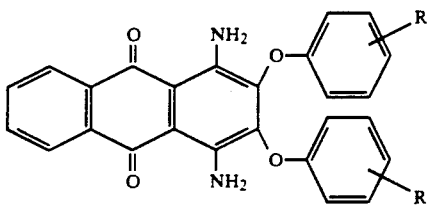

wherein R is selected from the group consisting of chlorine and lower alkyl.

2. The toner particles of claim 1 wherein R is a paratertiary butyl group.

3. The toner particles of claim 1 wherein R is a meta chloro group.

4. The toner particles of claim 1 which have a particle size in the range of 8 to about 20 microns, said copolymer contains about 60 to about 95 weight percent styrene and about 5 to about 40 weight percent butylacrylate, and said copolymer has a glass transition temperature in the range of about 40° to about 90° C.

5. The toner particles of claim 1 which comprise on a 100 weight percent total toner composition basis:
   about 93 to about 99 weight percent of said styrene/butylacrylate copolymer;
   about 0.5 to about 5.0 weight percent of said magenta dye; and
   about 0.5 to about 2.0 weight percent of a charge control agent.